(12) United States Patent
Needham

(10) Patent No.: US 7,546,596 B2
(45) Date of Patent: Jun. 9, 2009

(54) NON-DISRUPTIVE METHOD, SYSTEM AND PROGRAM PRODUCT FOR OVERLAYING A FIRST SOFTWARE MODULE WITH A SECOND SOFTWARE MODULE

(75) Inventor: Thomas D. Needham, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 10/811,707

(22) Filed: Mar. 29, 2004

(65) Prior Publication Data

US 2005/0216904 A1    Sep. 29, 2005

(51) Int. Cl.
*G06F 9/44* (2006.01)
(52) U.S. Cl. ................ 717/169; 717/170
(58) Field of Classification Search .......... 717/168–178
See application file for complete search history.

(56) References Cited

U.S. PATENT DOCUMENTS

| | | | | |
|---|---|---|---|---|
| 4,769,767 A | | 9/1988 | Hilbrink | 364/200 |
| 5,568,641 A | * | 10/1996 | Nelson et al. | 713/2 |
| 5,740,351 A | | 4/1998 | Kasten | 395/183.11 |
| 6,457,175 B1 | | 9/2002 | Lerche | 717/173 |
| 6,473,899 B1 | | 10/2002 | Nelson et al. | 717/173 |
| 6,615,404 B1 | | 9/2003 | Garfunkel et al. | 717/173 |
| 6,640,334 B1 | * | 10/2003 | Rasmussen | 717/171 |
| 6,782,448 B2 | * | 8/2004 | Goodman et al. | 711/112 |
| 7,089,547 B2 | | 8/2006 | Goodman et al. | 717/168 |
| 7,093,244 B2 | * | 8/2006 | Lajoie et al. | 717/168 |
| 7,099,967 B2 | * | 8/2006 | Farkas et al. | 710/104 |
| 7,146,609 B2 | * | 12/2006 | Thurston et al. | 717/169 |
| 7,178,141 B2 | * | 2/2007 | Piazza | 717/168 |
| 7,185,191 B2 | * | 2/2007 | Bosley et al. | 713/2 |
| 2002/0083427 A1 | | 6/2002 | Li | 717/169 |
| 2002/0104051 A1 | | 8/2002 | Gupta | 714/733 |
| 2003/0005158 A1 | | 1/2003 | Howard et al. | 709/245 |

* cited by examiner

*Primary Examiner*—Ted T Vo
(74) *Attorney, Agent, or Firm*—Arthur Ortega, Esq.; Kevin P. Radigan, Esq.; Heslin Rothenberg Farley & Mesiti P.C.

(57) ABSTRACT

A mechanism is provided for non-disruptive replacing of a first software module with a second software module in an embedded system. The mechanism includes copying update control code from the first software module to memory space outside a memory location of the first software module, and then replacing the first software module with a second software module by storing the second software module in memory at a location which at least partially overlies the first software module. The replacing includes executing the update control code copied from the first software module during the replacing. Upon completing storing of the second software module, execution of the second software module is begun without resetting the system.

7 Claims, 6 Drawing Sheets

NON-DISRUPTIVE METHOD, SYSTEM AND PROGRAM PRODUCT FOR OVERLAYING A FIRST SOFTWARE MODULE WITH A SECOND SOFTWARE MODULE

TECHNICAL FIELD

The present invention relates generally to the field of software installation, and more particularly, to the non-disruptive replacing of a software module, for example, of an embedded system, with an updated software module without requiring resetting of the embedded system.

BACKGROUND OF THE INVENTION

Many products developed in the preceding decades have been designed to function using a mixture of computer hardware and software. When such a product is not intended to be perceived as a computing platform, it is often referred to as an embedded computing system, or embedded system. Examples include DVD players, microwave ovens, digital cameras, cell phones, automobile engine controllers. These systems contain a computing element such as a microprocessor or microcontroller and specific software to perform their intended function, which is typically referred to as "firmware" because of the high level of hardware dependence and lack of portability.

Some embedded systems have been designed to allow their firmware to be altered after leaving the factory. This alteration could be to add new features to the product (i.e., an "upgrade"), a change to alter the operation of the device to customize it for a specific application, or to fix defects in the product discovered after the product has been shipped. Typically, these changes are done disruptively, i.e., the system is shut down, the firmware changed, and then the system is reinitialized or restarted. The system is unavailable during the time that the firmware is being changed, and programmable settings may have to be restored.

The disruption may be acceptable in many cases, but some embedded products are designed to be in use continuously, i.e., 24 hours a day. Examples include a system that controls the traffic lights at a busy intersection, a radar controller at a busy airport, a communications adapter in a computer system used for worldwide credit card transactions, telephone controls in an emergency response (911) call center. A specific product with this requirement is the input/output (IO) adapter cards in an IBM e-server Z990 computer system. In these high availability systems, there is no convenient time when the system can be shut down for several minutes while the firmware is changed.

In such high availability systems, the capability to concurrently (i.e., non-disruptively) change the operating firmware would be desirable. This capability is referred to herein as "concurrent firmware activation" or "non-disruptive code load". To be considered non-disruptive, the change to the firmware should have negligible impact on the intended function of the system; that is, no errors created, no loss of computing resources, no data corruption, minimal performance degradation. The impact to the end users is typically a lack of response or function for a very short period of time, followed by normal operation with the new firmware. The acceptable length of time for the change may range from milliseconds to seconds. The exact specification is dependent on the application.

In some embedded systems, the firmware is implemented as several object modules that are dynamically linked together at initialization time. The linking is accomplished by a linker resident in the first module to be loaded into memory at initialization time. In other systems, the firmware is implemented as a single statically linked module. The linking was done using a different computing platform, and only the final single executable module is loaded into the embedded system memory.

In some systems, non-disruptive code load can be accomplished by the resident linker dynamically linking in a new module with previously loaded modules, or in place of a previously loaded module. The loader and linker may be part of an embedded operating system, and most of the operating system typically can not be concurrently altered. There are a number of reasons why this can not be done, but one is that the module containing the loader would be overwriting itself.

When using a multiple module system, even if the loader/linker module is not being replaced, incompatibilities between old and new modules may arise, making the technique more difficult, if not impossible. When replacing more than one module, there are multiple steps and states involved, increasing potential operational problems. In some embedded systems, memory may be constrained, leaving no room for new modules while an old module is still present. A solution would be to consolidate the modules into one large statically linked module, but the problem of the loader/linker overlaying itself prevents this. The present invention is directed to solving this problem.

SUMMARY OF THE INVENTION

The shortcomings of the prior art are overcome and additional advantages are provided through the provision of a non-disruptive method for replacing a first software module of a system with a second software module. The method includes: copying update control code from the first software module to memory space outside a memory location of the first software module; replacing the software module with the second software module by storing the second software module in a memory location which at least partially overlies the first software module, wherein the replacing includes employing the update control code copied from the first software module to facilitate the replacing; and beginning execution of the second software module without resetting the system.

Systems and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
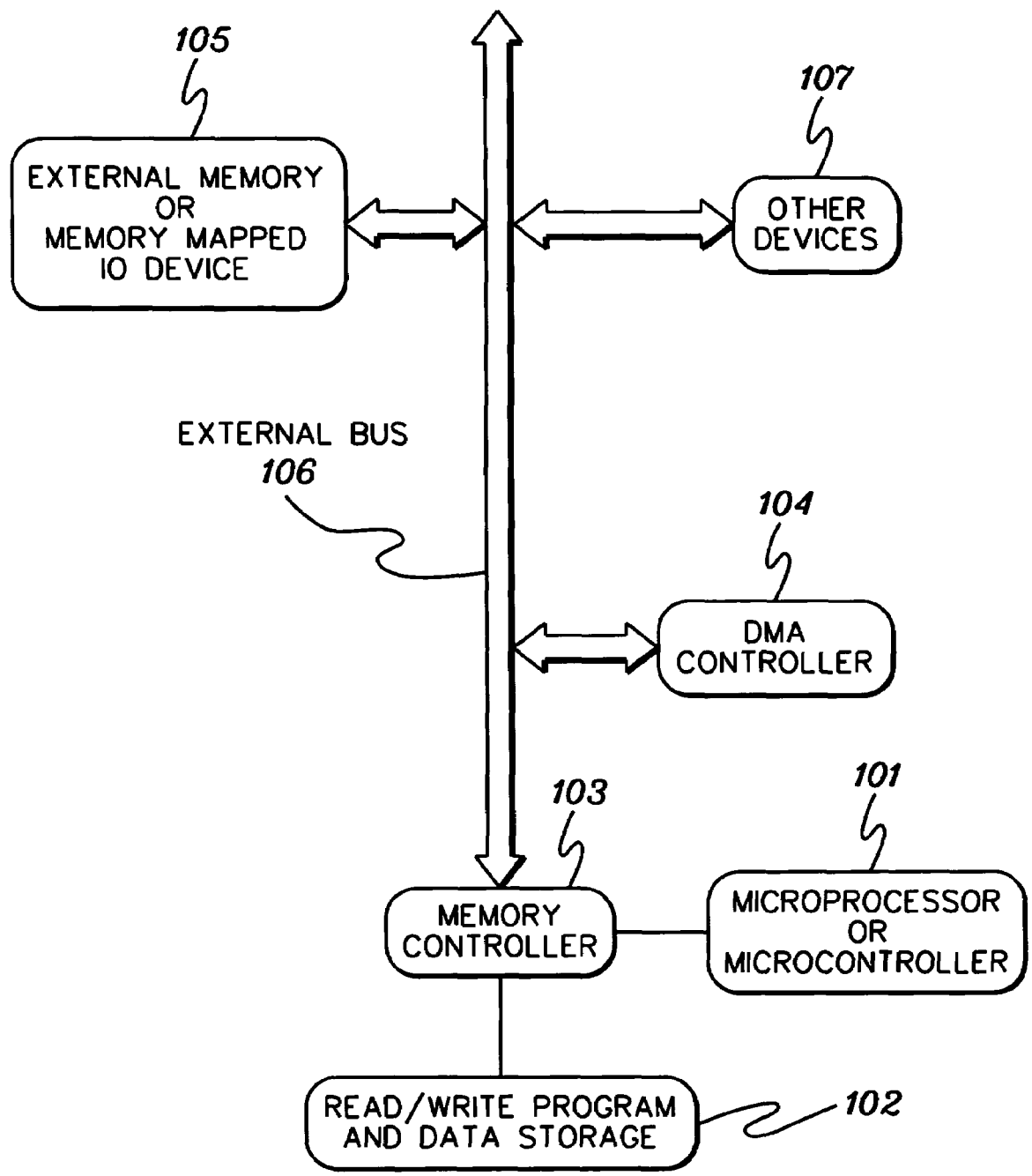
FIG. 1 is a block diagram of a system to employ a non-disruptive software module replacement procedure, in accordance with an aspect of the present invention.

FIG. 1 depicts one embodiment of an embedded computer system, which includes a microprocessor or microcontroller 101 attached to a volatile read/write memory 102 for instruction and data storage. The volatile memory is typically dynamic random access memory (DRAM) or static random access memory (SRAM). The memory attachment may be via an external memory controller 103 or the memory controller may be integrated into the microcontroller or ASIC. There is usually a direct memory access (DMA) controller 104, which may also be external or integrated. Since the memory used for instructions and data is volatile, the initial firmware is assumed to have been loaded into this memory from an external source. In this diagram the external source is shown as an external memory 105 attached via an external bus 106, which typically is too slow for normal operation. In an actual implementation, this external memory could be a non-volatile memory such as flash, a memory in a different computer system, or memory in a host computer system, where the embedded system in question is an adapter. Memory device 105 could even be a removable input/output (I/O) media such as a flash card or key. One consideration for an embodiment as described herein is that memory/device 105 be capable of supporting data transfer via the DMA controller to the volatile memory 102 in a timely fashion. Besides being the source of the initial operational code for the system, it is also the source for a new code update (i.e., new software module).

In a typical implementation, there are other devices 107 on the external bus 106 which are specific to the application of the embedded system. Their operation and function are not relevant to this discussion as long as they do not preclude the operations described herein. Also, there are implementations in which the hardware elements discussed herein are integrated into a single semiconductor device.

This description assumes that the software module to be replaced is either the only code module in the system, or is the module containing the loader/linker in a multiple module system. In the interests of clarity, no other modules are shown in the diagrams.

Figure 2:
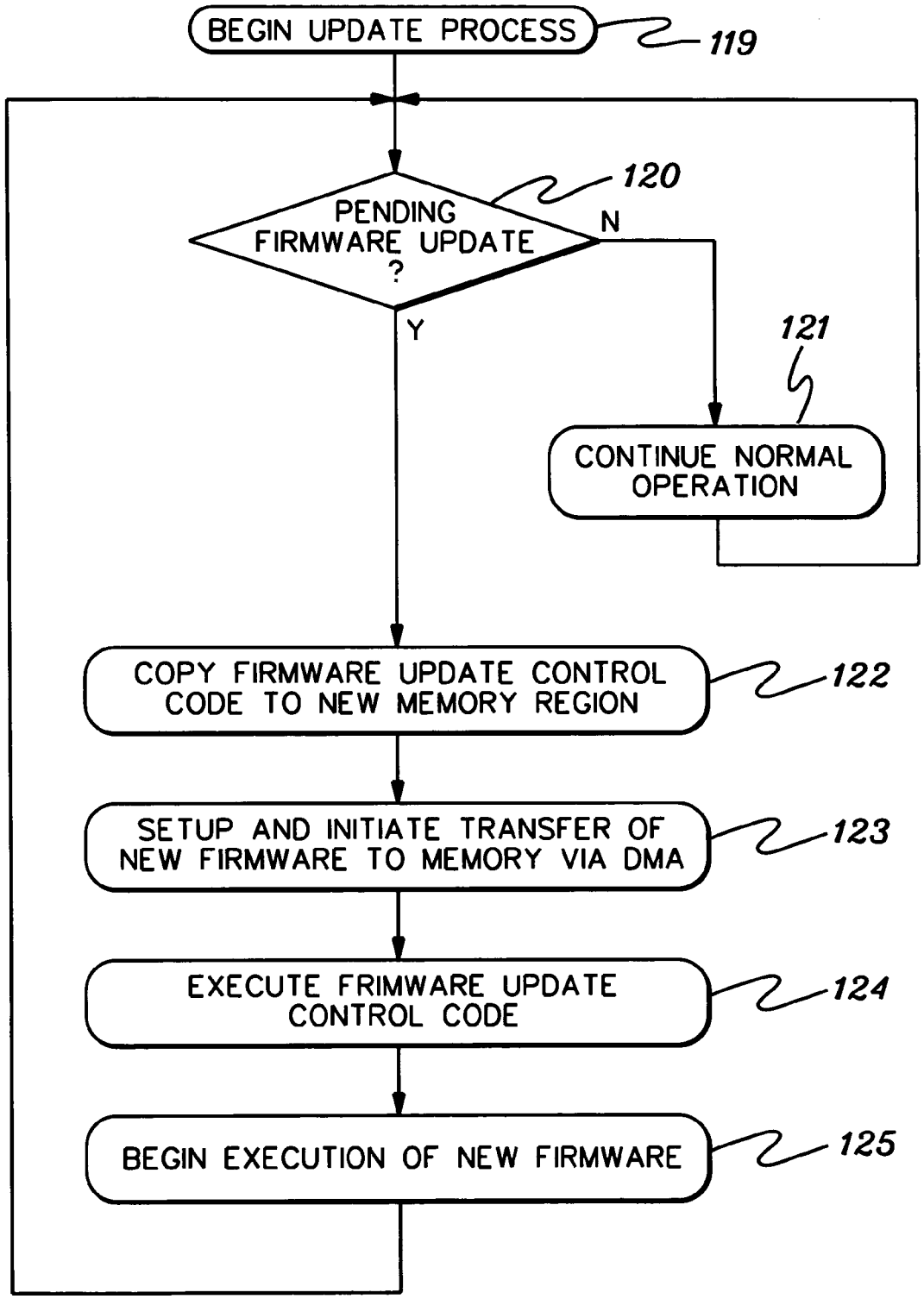
FIG. 2 is a flowchart of one embodiment of a process for replacing a software module, in accordance with an aspect of the present invention.

As shown in FIG. 2, the update process begins 119 with logic determining whether there is a pending firmware update 120. If "no", then normal operation of the embedded system is continued 121. How logic checks for a pending firmware update and how often the logic checks for an update are application specific. Examples of how this might be implemented include: polling a bit in a hardware register set when a new level of firmware has been placed in the external memory, or a bit set in a particular memory location by code executing on the host computer.

When the firmware has detected that it should be replaced (e.g., updated), the logic copies a small amount of relocatable instructions from its own instruction area into another portion of memory 122. These relocatable instructions are referred to herein as firmware "update control code". Due to the need for close programmer control over the content and nature of these instructions, the update control code could be implemented in assembler language for the microcontroller in question. The firmware examines the header of the updated software module to determine the new module's entry point (1st instruction to be executed) and provides the entry point to the update control code for use in initiating execution of the updated software module once loaded. It is assumed herein, that in one embodiment, the entire software module to be replaced is non-relocatable, for example, due to memory constraints. Further, an assumption is made that the entire software module is to be replaced by a new software module, and due to memory constraints, the new software module will at least partially overlie the original software module.

With the firmware update control code in position, the firmware initiates a DMA transfer of the new firmware from the external memory to the instruction memory 123. The target address is typically the same as the old firmware, but could be different. If it is the same address, then once the transfer has started, the prior firmware is likely to be overwritten in a short amount of time. The branch to the relocated firmware update control code 124 thus occurs prior to the code being overwritten. These instructions are saved outside the DMA memory target area, and will therefore not be overwritten. After completing updating of the firmware, processing begins execution of the new firmware 125 without resetting (i.e., without reinitializing or restarting) the embedded system.

The specific details of how the DMA firmware transfer takes place are dependent on the DMA hardware in the embedded system. If there is no DMA hardware present, it would still be possible to implement the transfer of new firmware via a software based copy routine inside the firmware update control code. That might increase the length of time such a copy would take though.

Figure 3:
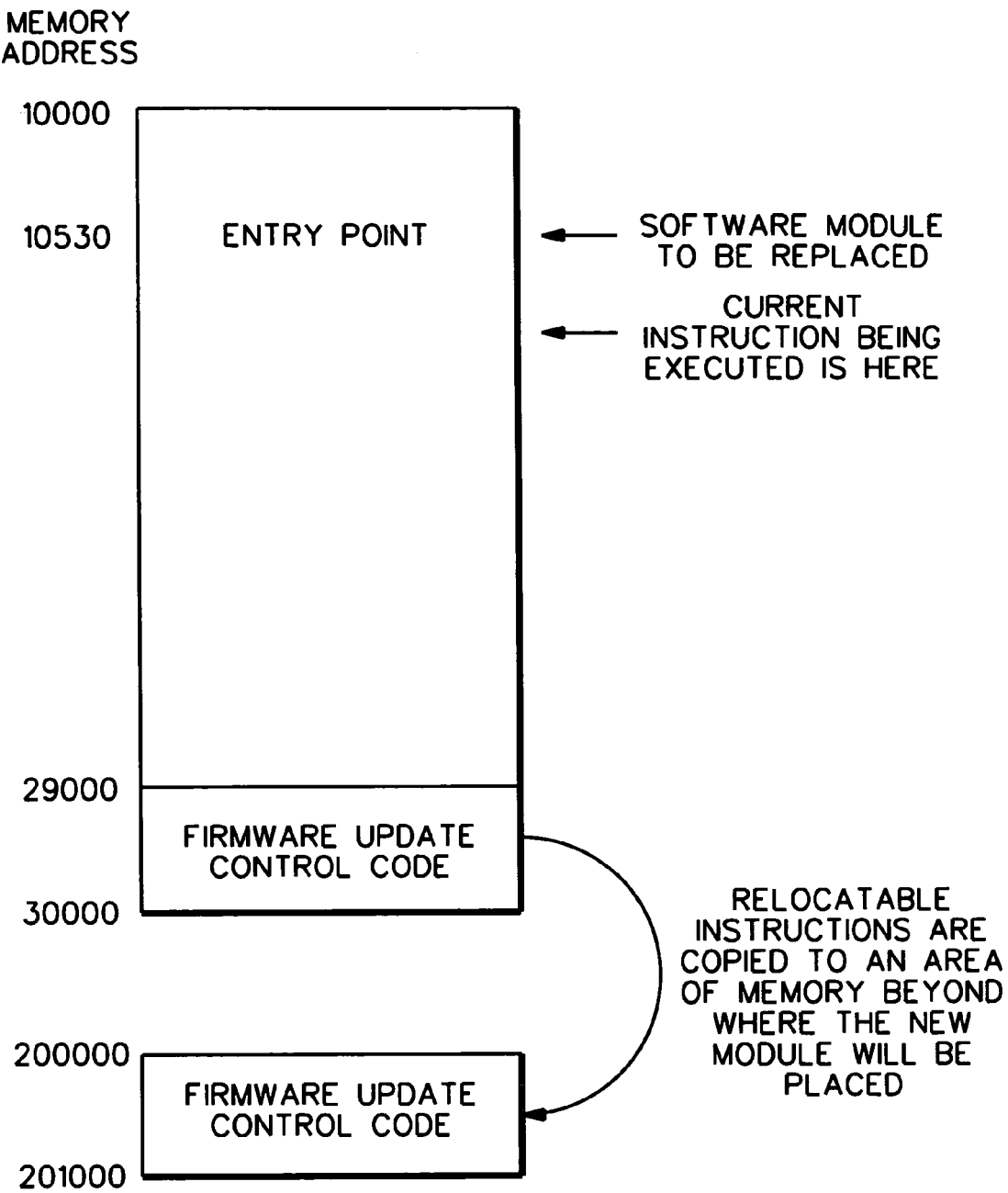
FIG. 3 is a depiction of memory space containing a software module to be updated, and showing update control code being copied from the software module to a memory space beyond where the updated software module is to be placed, in accordance with an aspect of the present invention.
Figure 4:
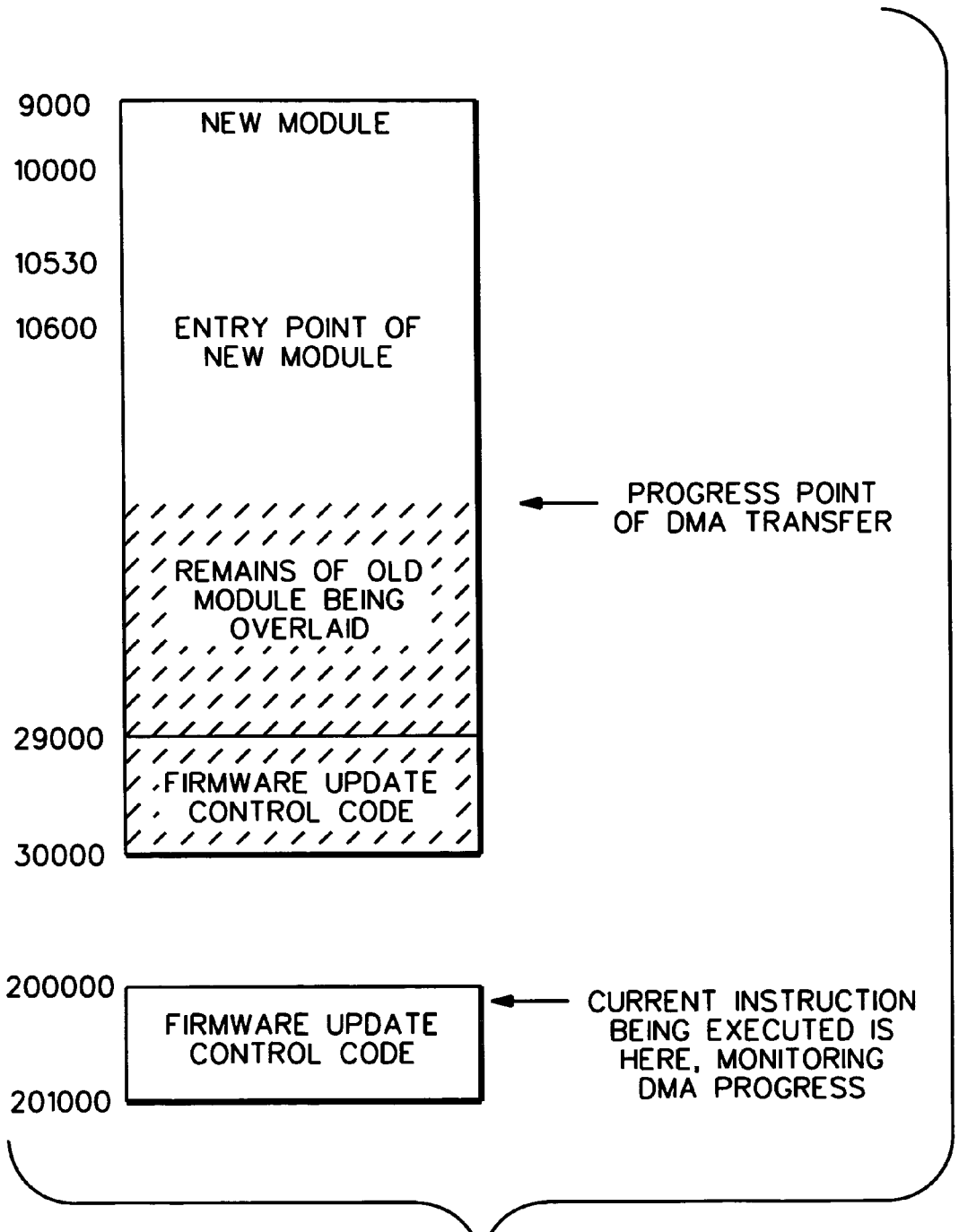
FIG. 4 is a depiction of the memory space of FIG. 3, showing a portion of the updated software module overlaying the original software module, in accordance with an aspect of the present invention.
Figure 5:
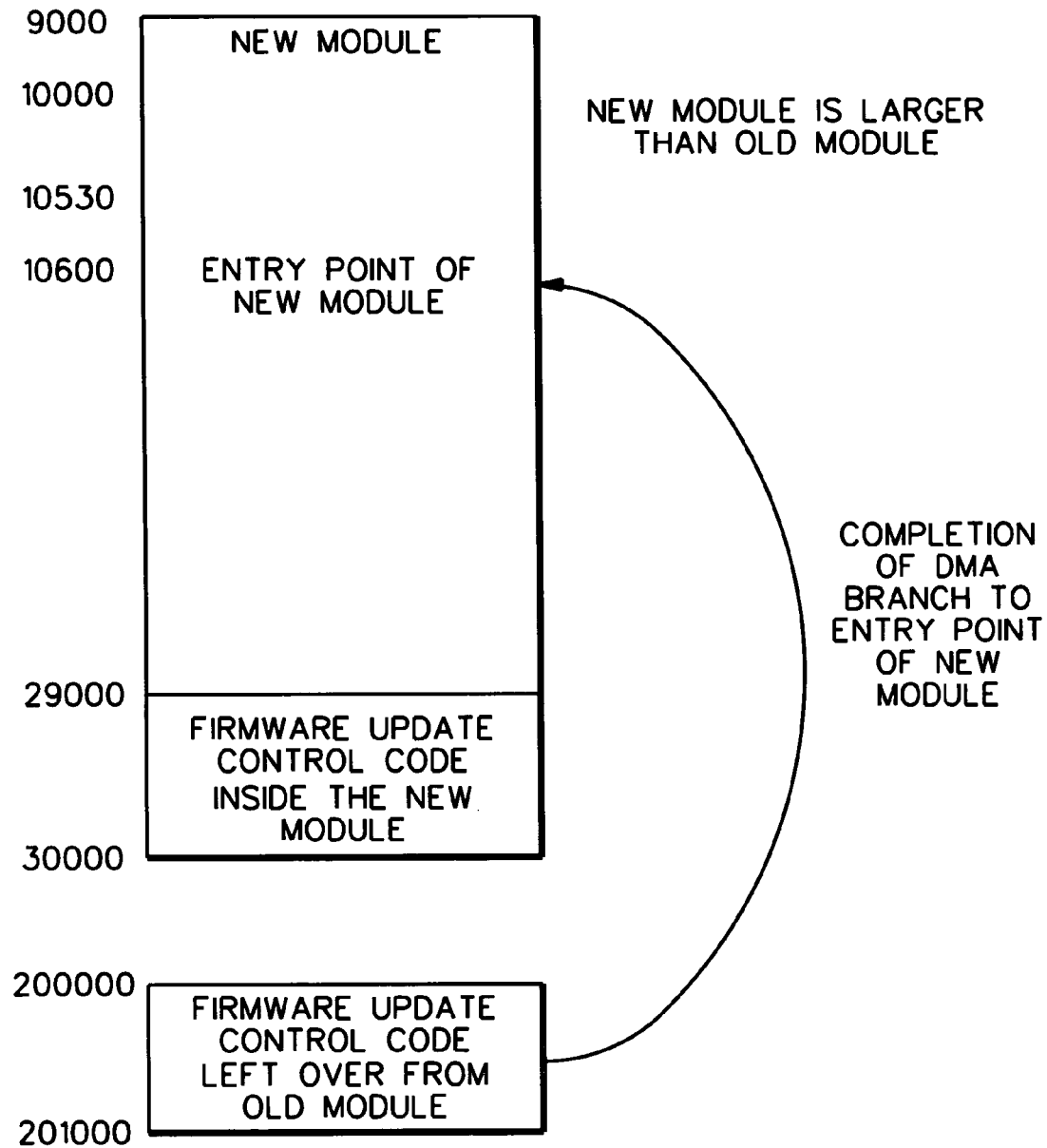
FIG. 5 is a depiction of the memory space of FIGS. 3 & 4 showing the updated software module fully loaded into the memory space and showing use of the update control code from the original software module to branch to the entry point of the updated software module, in accordance with an aspect of the present invention.

FIGS. 3-5 graphically illustrate the non-disruptive method for replacing a software module of a system, in accordance with an aspect of the present invention. FIG. 3 depicts a section of memory which is assumed to include a single, statically linked software module to be replaced. This first module has an entry point at a specific memory address, and the current instruction being executed is located somewhere below that entry point. The first software module further includes firmware "update control code" which comprises a series of relocatable instructions, which are described further below in connection with FIG. 6. Upon receipt of an instruction to replace the software module, the relocatable instructions of the update control code are copied to an area of memory beyond where the new, second software module is to be placed. Due to the need for close programmer control over the content and nature of these relocatable instructions, the instructions could be implemented in assembler language.

During the replacement process, logic examines the header of the new software module to determine its entry point (first instruction to be executed), and the load address of the new module. Logic then initiates, e.g., a hardware based DMA of the new module to the target memory area. Because the target memory area is assumed to at least partially overlap the current module's own memory area, the first software module will be overwritten in a short amount of time. To avoid loss of control, an instruction branch is done to the area where the relocatable instructions are copied. These instructions are outside the DMA target area, and will therefore not be overwritten. At the time of the branch, certain parameters are passed into the relocated instructions; e.g., the entry point of the new module, and any necessary information on where to check to determine if the DMA operation has been completed.

FIG. 4 graphically depicts the overwriting of the prior software module with the new software module in an overlapping memory area, and shows the progress point of the DMA transfer. As noted, the current instruction being executed by the microcontroller is within the firmware update control code previously copied from the old software module. From this firmware update control code, the microcontroller is monitoring the DMA progress.

Figure 6:
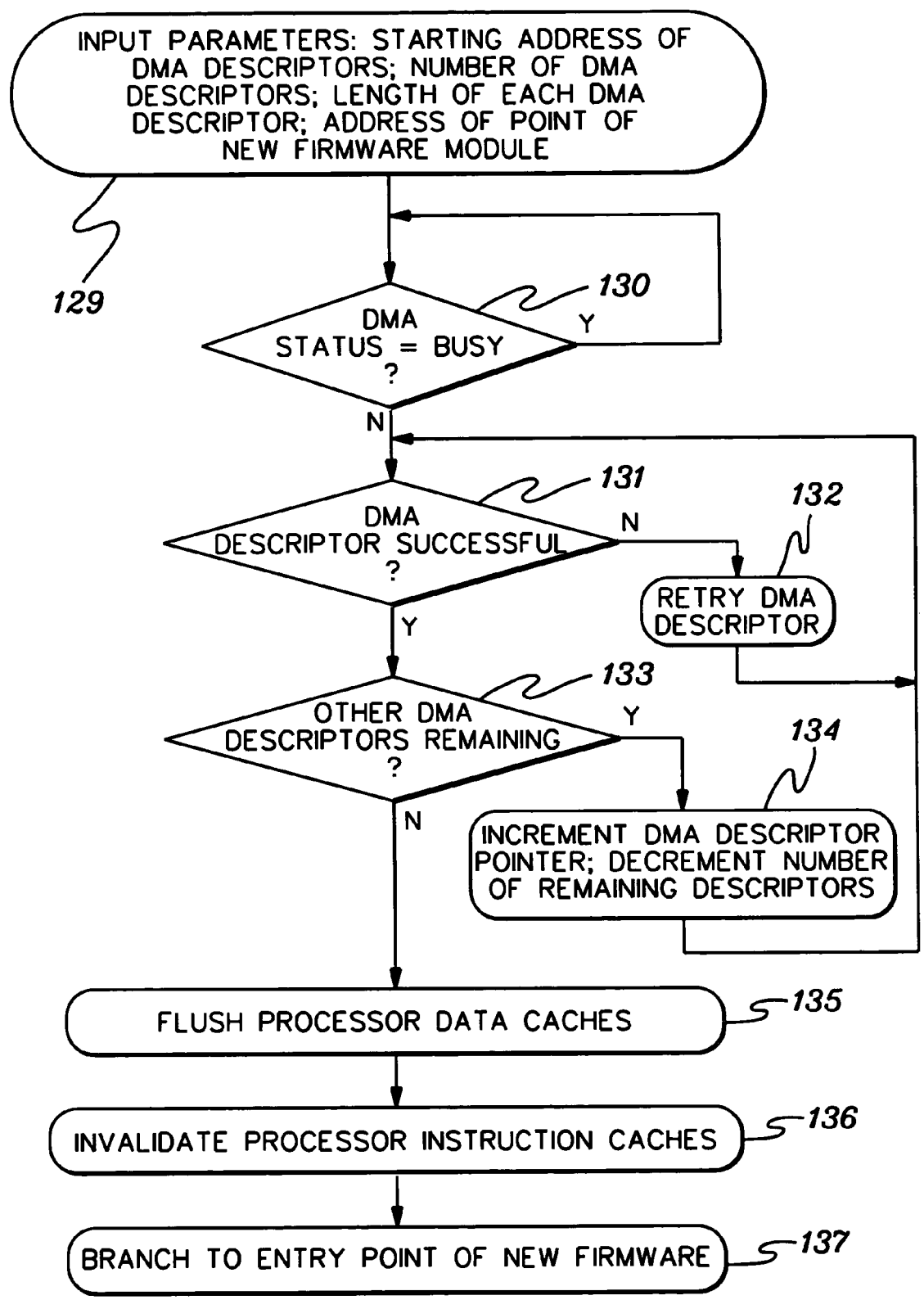
FIG. 6 is a flowchart of one embodiment of an update control code to be copied and then employed when replacing a first software module with a second software module, in accordance with an aspect of the present invention.

FIG. 5 depicts the memory area after the new software module has been copied into the memory. As shown, the new software module is larger in this example than the old software module and has a different entry point. Upon completion of the DMA operation, the microcontroller branches to the entry point of the new software module from the firmware update control code. Depending on the operation, the microcontroller might invalidate the processor instruction cache if present, before branching to the entry point of the new module. Instructions at the entry point of the new module take care of any other required setup, which is typically application dependent. At the point of the transition, the only instructions of the old software module are the relocated update control code instructions. These instructions are relatively simple and few, and have few dependencies on the characteristics of the new module, and are therefore, unlikely to cause incompatibility problems. FIG. 6 depicts one flowchart example of an update control code, in accordance with an aspect of the present invention.

Typically DMA controllers are implemented as a hardware state machine that has a programmable start address, number of bytes to transfer, and target address. More sophisticated implementations utilize a chain of DMA descriptors. A DMA descriptor is a block of memory with a fixed layout that contains the required information needed by the hardware to perform a single transfer. The state machine reads each descriptor in turn. The transfer is performed, and a return code is written by the state machine into a memory location within the descriptor to indicate successful completion or failure. The flowchart example of FIG. 6 for the firmware update control code assumes such a DMA implementation.

When branching to the firmware update control code, a particular implementation could pass certain parameters to the firmware update control code, such as the entry point of the new module, and information on where to check to determine if the DMA operation has completed. In the implementation of FIG. 6, this information (i.e., input parameters) includes the address of the first DMA descriptor, the number of DMA descriptors, the length of each DMA descriptor, and the entry point of the new module 129.

An initial action is to poll for DMA completion 130, typically by reading a register located in the DMA hardware. Once the status changes from 'busy', the first descriptor is checked to determine whether the transfer was successful 131. In this implementation, since the system is assumed to comprise a high availability system where the consequences of failure are severe, provision is made to retry that particular DMA descriptor if the descriptor has failed 132.

If the descriptor shows that the transfer was successful (and an assumption is made that the total amount to be transferred can not be contained in one descriptor) logic checks for more than one descriptor 133. If there is more than one descriptor, then the descriptor address is incremented by the size of the descriptor 134, and the number of remaining descriptors is decremented, facilitating a loop to cover the required descriptors for a complete firmware transfer.

Most modern processors contain a cache of particular memory locations to improve memory access performance. Typically these caches are divided into a separate instruction and data portion. These processors sometimes also maintain coherency with memory via cache snooping or another mechanism. This may mean that the new firmware instructions transferred into memory may have been stored in the processor data cache (L1 or L2), instead of the memory. If this data cache storage means that they are not accessible to the instruction fetch unit of the processor, they will have to be flushed out of the processor data cache, and into the memory where they can be fetched by the processor when doing instruction fetches. This implementation example assumes that this is the case and the data cache is flushed 135. This step is obviously dependent on the embedded system hardware and cache configuration.

Upon completion of the firmware update transfer, it is likely that the processor instruction cache contains many instructions left over from the old level of firmware. To eliminate those instructions, the instruction cache is simply invalidated 136 so all future instructions must be fetched from the new firmware in memory.

A final step is to branch to the entry point of the new firmware module, using the address that was passed in as a parameter 137. It may not be a requirement in every situation, but typically a parameter is passed into the new firmware to tell it that it is starting up in a concurrent update situation, as opposed to a disruptive start up. This would allow it to alter it's operation accordingly. For example, rather than initializing a control table in memory, it might skip that step and begin using the one that was left behind by the old firmware level. Such details are application dependent.

Note that the firmware update control code can be itself quite simple. Code to initialize the firmware module, such as to set up stack space, memory heaps, table pointers, etc. is kept inside the firmware module, and can be used when the system is first initialized as well as when changing firmware levels.

One example of pseudocode for the firmware "update control code" is set forth below.

```
                              ! Input parameters in registers:
                              ! r3 = DMA descriptor address
                              ! r4 = DMA descriptor count
                              ! r5 = DMA descriptor size
                              ! r6 = entry point of new firmware
         mov_reg    r8,r6     ! save entry point in r8
```

-continued

```
Kill_time:                              ! Give DMA time to get started
    load_immed    r7,0x7FFF             ! set amount of time to waste
    mtctr    r7                         !move count to counter
kill_time1:
    bdec_nz    kill_time1               ! Decrement counter and branch if not zero
!---------------------------------
!check to see if DMA Engine is
!done
!---------------------------------
    mfreg r7,DMA_ENGINE_STATUS          ! Read DMA status
    compare r7,0x0000                   !if 0, still processing
    bne    chk_dma_entry                ! If not zero, DMA is complete
    b    kill_time
!---------------------------------
!checking DMA descriptors
!---------------------------------
chk_dma_entry:
    compare r4,0x0000       ! Do we have zero DMA descriptors remaining?
    beq start_main          !branch if DMA remaining count is 0
    load_word r7,0(r3)      !load DMA result word into r7
    compare r7,0x0000       !compare good value to DMA value
    bne    retry            !if not equal retry the DMA
    ! DMA successful
    add    r3,r3,r5         !increment DMA descriptor addr by DMA desc size
    subi    r4,r4,0x0001    !decrement DMA descriptor count
    b    chk_dmq_entry
!---------------------------------
!retry of DMA descriptors
!---------------------------------
retry:
    load_immed r10,0xFFFF               ! New value to write to descriptor
    store    r10,0(r3)                  !store descriptor start value to descriptor
    load_immed    r10,0x0001            ! Restart bit
    mtreg RESUME_DMA0_EXEC_ER,r10       !Tell DMA engine to restart
    b    kill_time
!--------------------------------------------------
! branch to new firmware entry point
!--------------------------------------------------
start_main:
    !----------------------------------------
    ! Flush processor data cache
    dcfl
    !----------------------------------------
    ! Invalidate processor instruction cache
    !----------------------------------------
    iccci
    !----------------------------------------
    ! now actually branch to new firmware
    !----------------------------------------
    load_immed r3,G_PATCH        ! Parameter to new firmware
    load    r7,0x0(r8)           ! Read what the actual 1st instr address is
    mtctr    r7                  ! Put 1st instruction address in counter register
    bctrl                        !branch unconditionally to addr in counter register
DONE:    b    DONE               ! Infinite loop that will never be reached
```

To summarize, those skilled in the art will note from the above discussion that provided herein is a non-disruptive approach for replacing a first software module of a system with a second module. As one example, the first software module and the second software module may each comprise single statically linked modules. In accordance with the approach presented, the probability of incompatibility between the old software module and the new software module is very low. The new software module can occupy the same region of memory as the old software module, which is advantageous in a memory constrained system such as an embedded computer system. Any data that needs to be preserved through the transition can be stored in memory outside of the target memory space for the new software module. In a system that employs multiple modules dynamically linked, the non-disruptive replacement mechanism disclosed herein would be advantageous for concurrently replacing the module containing the loader/linker. In such a case, the module being replaced leaves behind enough information for the new module, containing the new linker, to link itself to other modules that have not been replaced.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A non-disruptive method for replacing a first software module of a system with a second software module, the method comprising:

copying, by a currently executing, first software module of a system, update control code from the currently executing, first software module to memory space outside a memory location at which the first software module is currently executing, wherein only the update control code is copied from the currently executing, first software module to the memory space outside the memory location at which the first software module is currently executing;

replacing the currently executing, first software module with a second software module by storing the second software module in memory at a location which at least partially overlies the memory location at which the first software module was executing, wherein the replacing includes employing the update control code copied from the first software module to memory space outside the memory location from which the first software module was executing, and wherein the replacing includes executing the update control code copied from the first software module during the replacing of the first software module with the second software module to monitor replacing of the first software module with the second software module;

responsive to the replacing, and without resetting or restarting the system, branching from executing the update control code to executing code of the second software module at an entry point thereof specified by the update control code, thereby beginning execution of the second software module; and wherein the first software module and the second software module are each a single statically linked module.

2. The method of claim 1, wherein the first software module comprises an operating firmware module, and the system comprises an embedded system, and wherein the replacing includes overlaying the memory location of the operating firmware module with the second software module, the second software module comprising an updated firmware module.

3. The method of claim 2, wherein the update control code is only a portion of the currently executing, first software module.

4. The method of claim 1, wherein the first software module includes at least one of a loader and a linker, and wherein the replacing includes overlaying the memory location of the first software module with the second software module.

5. The method of claim 1, further comprising leaving data to be maintained during the replacing of the first software module in memory space outside the memory location of the first software module.

6. The method of claim 1, wherein the system comprises an embedded system, and the first software module and the second software module each comprise a firmware module.

7. The method of claim 1, wherein the replacing employs a hardware based direct memory access (DMA) operation to save the second software module to a target memory space and wherein the copying update control code comprises copying the update control code to memory space outside the target memory space, and wherein the update control code includes control code for determining when the DMA operation has completed and for branching to an entry point of the second software module upon completion of the DMA operation.

* * * * *